United States Patent
Chennakeshu et al.

[11] Patent Number: 6,034,987
[45] Date of Patent: Mar. 7, 2000

[54] SYSTEM FOR IMPROVING THE QUALITY OF A RECEIVED RADIO SIGNAL

[75] Inventors: Sandeep Chennakeshu; Gregory Edward Bottomley, both of Cary, N.C.; Paul Wilkinson Dent, Stehag, Sweden

[73] Assignee: Ericsson Inc., Research Triangle Park, N.C.

[21] Appl. No.: 08/768,319

[22] Filed: Dec. 17, 1996

[51] Int. Cl.⁷ ..................................................... H04K 1/10
[52] U.S. Cl. .......................... 375/202; 375/267; 375/299; 455/101
[58] Field of Search ...................... 375/200, 202, 375/260, 267, 299, 347; 455/63, 65, 101, 129, 276.1, 500, 506; 342/374, 375

[56] References Cited

U.S. PATENT DOCUMENTS

| | | | |
|---|---|---|---|
| 4,800,390 | 1/1989 | Searle | 342/383 |
| 5,142,534 | 8/1992 | Simpson et al. | 370/330 |
| 5,563,610 | 10/1996 | Reudink et al. | |
| 5,648,968 | 7/1997 | Reudink | 370/335 |
| 5,663,990 | 9/1997 | Bolgiano et al. | 375/347 |
| 5,748,669 | 5/1998 | Yada | 375/202 |

*Primary Examiner*—Amanda Le
*Attorney, Agent, or Firm*—Jenkens + Gilchrist

[57] ABSTRACT

A delay spread is created in a digital radio signal to reduce the coherence bandwidth and facilitate frequency hopping to reduce the effect of fading losses within an enclosed propagation environment The delay spread is introduced into the signal in several ways. One technique disclosed employs a transmitter with two separate antennas one of which transmits the digital signal and the other of which transmits the same signal after a phase delay has been introduced into the signal. The carrier frequency of the signals is hopped between at least two frequencies and the receiver processes the resulting signals. In another embodiment, a single transmit antenna is used but the signal is received by two different antennas with the output signal from one of those antennas being phase delayed before combining it with the other prior to processing by the receiver circuitry. Phase delay is also introduced at baseband into the signals to be transmitted by rotating the I and Q components of the waveforms before modulation.

21 Claims, 3 Drawing Sheets

Model of receiving field in built-up area a f=100MHz

Model of receiving field in built-up area a f=300MHz

SYSTEM FOR IMPROVING THE QUALITY OF A RECEIVED RADIO SIGNAL

BACKGROUND OF THE INVENTION

1. Field of the Invention

The invention relates to radio systems and, more particularly, to improving the efficiency of frequency hopping as a technique of reducing the effects of fading in an enclosed region of signal propagation.

2. History of the Related Art

Radio Transmission Problems

The quality of the signal received by a mobile station from a base station is affected from time to time by natural phenomena inherent in the use of radio signals to communicate. A factor common to most of the problems related to radio reception is that the desired signal at the receiver is too weak, either in comparison to thermal noise or in comparison to an interfering signal. An interfering signal can be characterized as any undesired signal received on the same channel by the receiver as the desired signal.

In the case of cellular radio systems where all of the frequencies in the available bandwidth are being reused throughout the cellular grid, the efficiency of the radio system is generally limited by the amount of interfering radio signals received rather than thermal noise.

One phenomenon which occurs to limit the quality of a received signal within a radio system is path loss. Even when there are no obstacles between the transmitting antenna and a receiving antenna, the received signal becomes progressively weaker due to the increasing distance between the base station and the mobile station. The received signal power is inversely proportional to a value somewhere between the square and the fourth power of the distance between the transmitting and receiving antennas.

A more common transmission problem in mobile radio systems used in an environment where there are objects such as buildings present, is that of log-normal fading. This phenomenon occurs as a result of the shadowing effect produced by buildings and natural obstacles such as hills located between the transmitting and receiving antennas of a mobile station and a base station. As the mobile station moves around within the environment, the received signal strength increases and decreases as a function of the type of obstacles which are at that moment between the transmitting and receiving antennas. The term "log-normal," comes from the fact that the logarithm of the received signal strength takes the form of a normal distribution about some mean value the minimum values of which are referred to as fading dips and the distance between which may be on the order of 30 to 60 feet.

A third phenomenon which effects signal strength within a mobile system operated in an urban environment is that of Rayleigh fading. This type of signal degradation occurs when the broadcast signal takes more than one path from the transmitting antenna to the receiving antenna so that the receiving antenna of the mobile station receives not just one signal but several. One of these multiple signals may come directly from the receiving antenna but several others are first reflected from buildings and other obstructions before reaching the receiving antenna and, thus, are delayed slightly in phase from one another. The reception of several versions of the same signal shifted in phase from one another results in the vector sum of the signals being the resultant composite signal actually received at the receiving antenna. In some cases the vector sum of the receive signal may be very low, even close to zero, resulting in a fading dip wherein the received signal virtually disappears. In the case of a moving mobile station, the time that elapses between two successive fading dips due to Rayleigh fading depends upon both the frequency of the received signal and the speed at which the mobile is moving. The distance between two fading dips due to Rayleigh fading may be on the order of 7 inches for the 900 megahertz radio band.

Referring to FIGS. 1A and 1B, there is illustrated a perspective model of the frequency/distance received signal fading pattern within a typical mobile radio operating environment. FIG. 1A represents the received signal field of a radio signal operating within an urban area at a frequency of 100 megahertz while FIG. 1B represents a radio signal operating in an urban area with a signal frequency of 300 megahertz. It can be seen from these diagrams how the strength of the signals vary, creating periodic fading dips which are both distance and frequency dependent.

In the case of digital radio systems, such as those in which time division multiple access (TDMA) modulation is used, other radio transmission difficulties arise. One of these difficulties, referred to as time dispersion, occurs when a signal representing certain digital information is interfered with at the receiving antenna by a different, consecutively transmitted symbol due to reflections of the original signal from an object far away from the receiving antenna. It thus becomes difficult for the receiver to decide which actual symbol is being detected at the present moment. Another transmission phenomenon inherent in the use of TDMA modulation is due to the fact that each mobile station must only transmit during a particular allocated time slot of the TDMA frame and remain silent during the other times. Otherwise, the mobile will interfere with calls from other mobiles to which are assigned in different time slots of the same frame.

Conventional Solutions to Radio Transmission Problems

There have evolved a series of techniques which are used to combat the signal degenerative phenomenons which occur in radio transmission systems. One solution which is employed to combat the problems of fading of a digital radio signal, from both log-normal fading and Rayleigh fading, is that of coding and interleaving. This is a technique in which the information representing various items of digital information is organized into blocks, and consecutive ones of a series of blocks, for example, four bits each, are organized into frames. If each of the consecutive bits of information are sent in the same order as they are generated by the speech encoder, the occurrence of a fading dip would totally obliterate several consecutive bits of information which would thus be lost from the communication stream and result in a gap in the speech to be recreated from them. With the technique of interleaving, however, the consecutive bits of information are systematically separated from one another and rearranged in a transmission stream in which they are, rather than contiguous to one another, separated in time from one another with each one forming one bit of a separate block of information. At the other end of the transmission stream the rearranged bits are removed from the blocks of data in which they were transmitted and reconstructed to again be contiguous to one another. When each of these bits representing speech data are separated from the other bits to which they are normally contiguous in time and "interleaved" among other bits not normally contiguous to one another in time and then an entire block of bits is lost from the transmission stream during a fading dip, at least some portion of that lost block can be constructed from the bits which were not lost during the dip because they were interleaved into other blocks which were not lost due to fading. In the case of a moving mobile station, a fading dip only occurs for a very brief period of time as the mobile passes through the region of fading and back into an area of good reception.

One technique used to secure a digital radio transmission against interference is that of error correction coding in which the bits of information to be transmitted are encoded with a correction code so that if bits are lost during transmission they can be recreated with a relatively high degree of accuracy at the receiver site by the error correction code circuitry. A part of the procedure used in correction coding of a digital signal transmission stream is that of interleaving.

An assumption inherent in the use of interleaving techniques with error correction coding is that the mobile is moving so that it passes through a fading dip relatively quickly and only experiences loss of a relatively small block of the digital information due to attenuation while it is located in the region of the fading dip. In the case of transmission environments which are indoors, for example, in a convention center or office building, a mobile station is relatively slow moving or perhaps even stationary. Thus, if the mobile happens to be in a physical location which is subject to a fading dip, it does not pass through that dip quickly and thus a large amount of information is lost due to the fade. Losses of large blocks of information cannot be corrected by mere interleaving and error correction coding.

Another technique used to compensate for transmission difficulties in a radio system is that of frequency hopping. In the use of frequency hopping the radio transmission and reception are at one carrier frequency for one instant of time and then a very short time later the transmission and reception is "hopped" to a different frequency. When a transmitted radio signal is at a different carrier frequency, it is not subject to the same fading pattern because such patterns are frequency dependent and thereby different for different frequencies. Thus, a stationary mobile station which may be in the trough of a fading dip at one carrier frequency might get relatively good reception at a different frequency. In this way, frequency hopping is used to further limit the amount of signal loss to a relatively short segment of the actual transmission time span and thus allow the signal processing circuitry to compensate for the loss of broadcast information with interleaving and error correction coding by reconstructing the lost portions of the transmission.

One important aspect of frequency hopping is that the two or more carrier frequencies between which the signal is successively hopped must each be separated by a certain minimum amount in order to experience independent fading on the different frequencies. In other words, the frequencies between which the signals are hopped must be sufficiently different from one another so that if the received signal is in a fading dip on one frequency it should not be in a fading dip on the other frequency. If the two frequencies are very close together it is more likely that the received signal will be weak due to fading at both frequencies. If, however, the two frequencies are separated from one another by a sufficiently large value then it is less likely that the received signal will be in fading dip on both frequencies. The separation between the two hopping frequencies which is sufficient to obtain independent fading one from the other is called the coherence bandwidth. If each of the two carrier frequencies used for hopping are within the coherence bandwidth, the signals received on each of the two frequencies will be highly correlated. If the carrier frequencies are separated by more than the coherence bandwidth then it is likely that the signals that are received on each of the two frequencies will be uncorrelated and thus, will not be in a fade condition at the same time. If the two frequencies are uncorrelated from one another the radio receiver will probably not experience a fade in the other frequency when one of them is in the fade condition.

When frequency hopping is being used in a TDMA radio signal, and the signal is being hopped across a different frequency during each of the several successive TDMA time slots, with each of the different carrier frequencies being reasonably far away from one another, then it is very likely that the signals received in each of the time slots are completely uncorrelated from one another. Moreover, if error correction coding and interleaving are used across the successive slots in which the signal is received, at least half of the bits received during two successive time slots will not be subjected to a fade condition, in which case the error correction coding and interleaving will do a satisfactory job of reconstructing the complete signal content despite the loss of content from one of the two slots.

In considering coherence bandwidth and correlation factors for frequency hopping applications, the coherence bandwidth is inversely proportional to the time delay spread of the transmission channel. Time delay spread occurs because of multipath propagation. The time difference is between the earliest and latest multipath signals, the main line-of-sight signal and the same signal delayed because one or more reflections creates a time span encompassing both the main signal and its principal echoes which contain most of the signal energy.

The coherence bandwidth of a signal is inversely proportional to the time delay spread of the signal. In the case of indoor implemented radio channels, the time delay spread is extremely small, for example, on the order of 50 to 100 nanoseconds. Thus, the coherence bandwidth for such signals would be very large, for example, on the order of 10 megahertz. Thus, in order to get independent fading in a frequency hopping environment the frequency difference between two carrier signals would have to be on the order of 10 megahertz, far greater than the bandwidth of most practical systems. It is an even greater problem to hop the carrier frequency of the signal over three or four separate frequencies requiring 30 to 40 megahertz of bandwidth.

One prior approach to the coherence bandwidth problem has been to create significant echoes of the broadcast signal by using a second transmitter. By delaying transmission on the second transmitter on the order of a symbol period, the second signal fades independently of the first as a function of the spacing of the second antenna from the first. While the receiver can resolve these two signals a more complex receiver is required in order to deal with the signal echoes. The TDMA signal requires an equalizer while CDMA signals require a Rake combiner.

Another solution has been to use no delay between two separate transmitting antennas, but, rather, to vary the phase differences between them. This causes the fading at the receiver to vary with time. However, due to receiver mobility, the combined effect can cause the fading to change so fast over time that the receiver processing circuity cannot deal with it. For example, if the receiver has a channel tracker for coherent demodulations it may not function properly if the fading changes too quickly over time. Further, if the mobile is designed to be stationary then a time varying phase may not be tracked by the receiver.

There is thus a need for some mechanism to allow the implementation of frequency hopping over a limited bandwidth to correct for flat fading channels in environments such as radio systems implemented in an indoor environment.

SUMMARY OF THE INVENTION

The system of the present invention solves some of the foregoing problems by causing the fading to be different on carrier frequencies without the creation of significant signal echoes or significant time variations in the signal. In one embodiment of the invention, multiple transmit antennas broadcast the same signal with different phases. In another embodiment, the signal received on multiple receive antennas are combined after changing the phase of one or both. In each case, the phase difference is changed as a function of carrier frequency. These phase changes can be implemented by using fixed delays between antennas or by using a phase shifter which does not change during a burst but does change between bursts.

In another aspect, the system of the present invention includes the creation of delay spread in a digital radio signal in order to decrease the coherence bandwidth of a signal so that frequency hopping may be implemented to correct for fading loss in an environment in which the mobile is relatively slow moving, for example, in an indoor environment.

BRIEF DESCRIPTION OF THE DRAWINGS

A more complete understanding of the method and system of the present invention may be obtained by reference to the following Detailed Description of the preferred embodiment(s) that follow, taken in conjunction with the accompanying drawings, wherein.

DESCRIPTION OF THE PREFERRED EMBODIMENT

In the implementation of the system and method of the present invention a phase change is introduced into one of two identical radio signal paths and the degree of change is a function of the carrier frequency of the signal. One exemplary approach is to use a fixed delay so that the phase change is equal to the carrier frequency ($H_z$) times the delay giving rise to a frequency dependant phase relationship between two different transmit antennas. This delay can be implemented, for example, with a surface acoustic wave (SAW) device. In contrast to prior art systems the delay introduced is very small so that no resolvable echoes of the signal are generated. The delay is only enough to cause a phase change that is different for different hop frequencies.

More specifically, in the creation of an "artificial delay spread" in a signal being broadcast in a limited bandwidth environment in which the mobile is relatively slow moving or stationary, the system of the present invention employs two separate antennas. The signal to each of the two antennas is delayed relative to the other so that the received signal appears to include both a main signal and a secondary signal. The extent of the phase difference between the two received signals is changed as a function of carrier frequency for hopped signals.

Figure 1A:
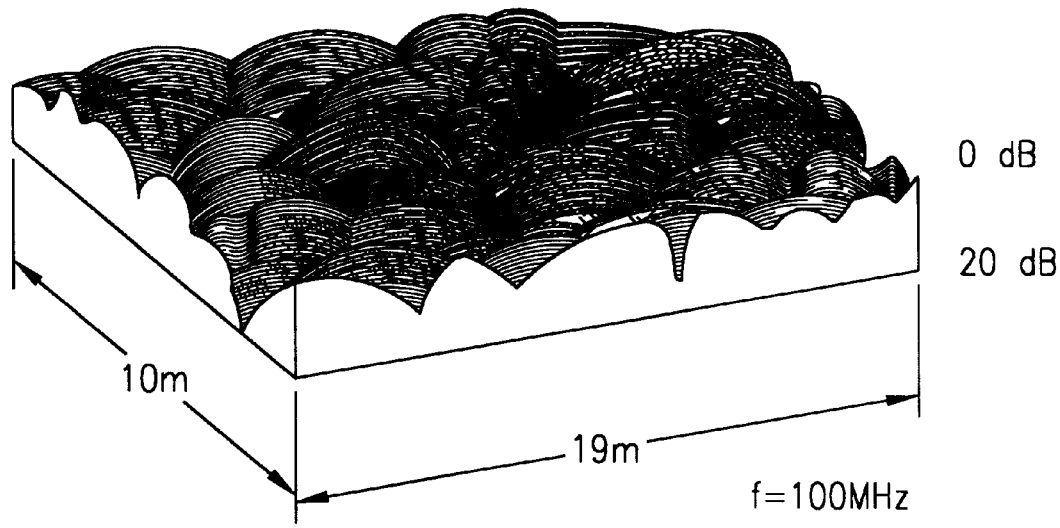
FIGS. 1A and 1B are diagrams illustrating the fading loss within a mobile radio environment as a function of distance over two different frequencies.
Figure 1B:
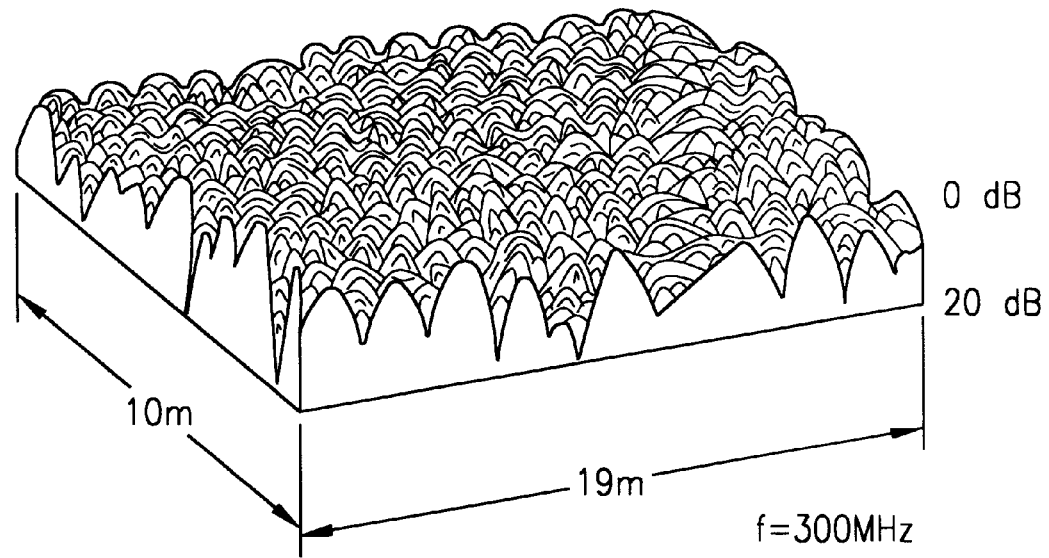
Figure 2:
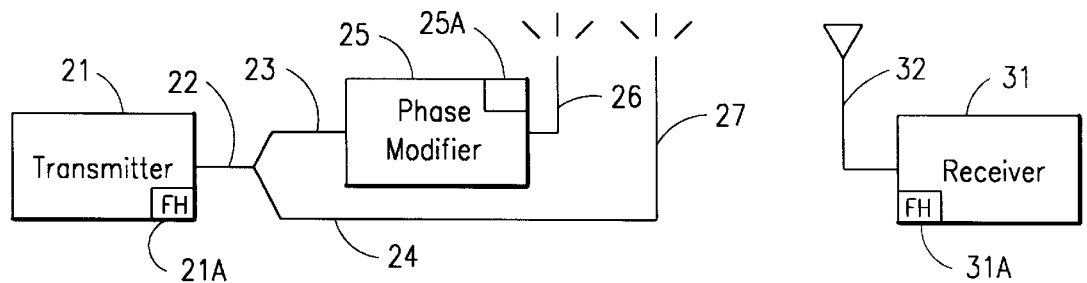
FIG. 2 is a block diagram of one embodiment of a system constructed in accordance with the present invention.

In the environment of the invention shown in FIG. 2, a transmitter 21 broadcasts a signal through an output lead 22 which is split into two paths 23 and 24. The signal traveling along path 23 passes through a phase modifier 25 to a broadcast antenna 26. A transmit filter 25A can be used, for example, in order to introduce a selected phase delay which varies with frequency. The other signal passes along line 24 to a different antenna 27. The phase modification is introduced to one of the signals to be on the order of a fraction of the symbol rate so that a minor delay spread is simulated between the respective signals broadcast from antennas 26 and 27. A receiver 31 receives the two phase shifted signals from antennas 26 and 27 at a single receive antenna 32. At the receive antenna 32 it appears as if a small amount of time delay spread has occurred, so that an equalizer or a Rake combiner is not necessary. Instead, the two signals either constructively add or cancel, depending on the position of the receiver and the carrier frequency. A frequency hopping mechanism 21A in transmitter 21 hops the signal broadcast between frequencies and another frequency hopping mechanism 31A in receiver 31 hops the signal reception between frequencies, e.g., from a signal having a first frequency to a signal having a second frequency.

Figure 3:
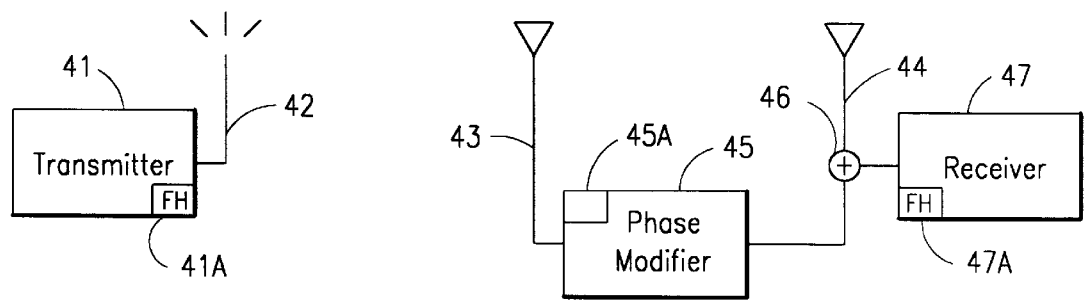
FIG. 3 is another embodiment of a system constructed in accordance with the teachings of the present invention.

Referring next to FIG. 3, there is shown an embodiment of the invention in which a signal transmitter 41 broadcasts over a single transmitting antenna 42. That signal is received by both a first antenna 43 and a second antenna 44. The output signal from the first antenna passes through a phase modifier 45 and thence into a combiner 46 in which it is combined with the unmodified signal from antenna 44. The combined signal is then introduced into the receiver 47 which processes the signals. The phase modified signals from antenna 44 and the unmodified signal from antenna 44 are combined in combiner 46 to simulate a delay spread between the two received signals which can be processed in the receiver 47. This simulated delay spread produces a smaller coherence bandwidth, which permits effective frequency hopping over a relatively modest bandwidth to combat fading of the signal in an enclosed environment. As discussed in connection with FIG. 2, frequency hopping mechanisms 41A and 47A in transmitter 41 and receiver 47, respectively, control frequency hopping.

Figure 4:
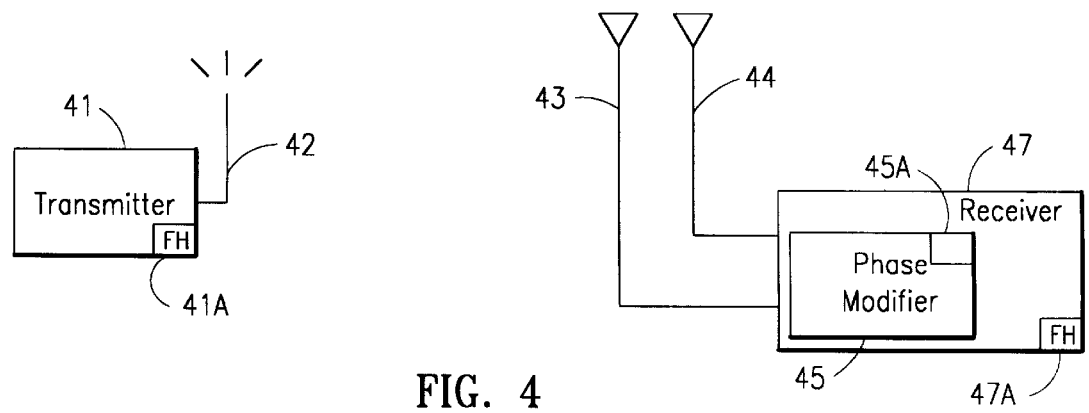
FIG. 4 is a different embodiment of a system constructed in accordance with the present invention.

The embodiment of the invention shown on FIG. 4 is similar to that of FIG. 3 in which a signal transmitter 41 connected to a transmitting antenna 42 transmits a signal which is received at a first receiving antenna 43 and a second receiving antenna 44. The signals are introduced into a receiver 47 and one of the two signals is processed independently of the other to introduce a delay 45 (transmit filter 45A) and again simulate delay spread. This reduces the coherence bandwidth of the two signals allowing frequency hopping over a reasonable frequency bandwidth to correct for certain fading losses. As discussed above, frequency hopping mechanisms 41A and 47A control frequency hopping.

Figure 5:
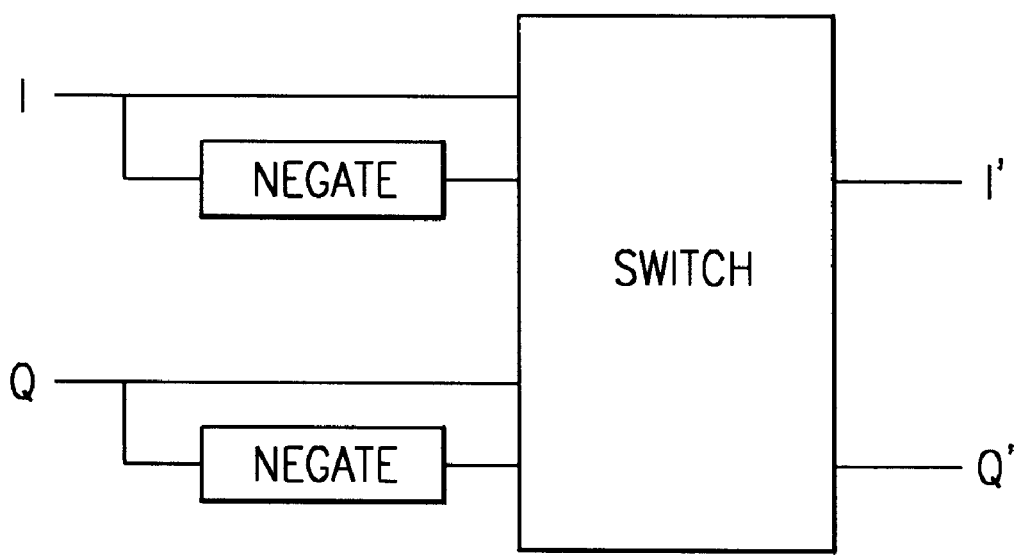
FIG. 5 is a block diagram illustrating the introduction of phase delays into a baseband signal by rotation of the I and Q waveforms prior to modulation.

The system of the present invention may be implemented in other ways. For example, instead of using a delay, some type of phase offset that varies from frequency hop to frequency hop could be employed. In a transmitter such a delay could be introduced at baseband by rotating the I and Q waveforms prior to modulation as illustrated in FIG. 5. Rotation by increments of 0, 90, 180 and 270° are preferable so that the rotated signals, I and Q are related to the original signals in the following simple ways:

$I'=I; Q'=Q(0°)$.

$I'=-Q; Q'=I(90°)$.

$I'=-I; Q'=-Q(180°)$.

$I'=Q; Q'=-I(270°)$.

Which degree of rotation could be selected at random from hop to hop or be a function of the hop frequency control signal or follow some regular fixed pattern.

A similar technique can be used when there are two received signals. For example, the signals can be simply added together (0°), or the difference of the two signals can be taken as well as other means of modifying the signals. In U.S. patent application Ser. No. 07/585,910, now U.S. Pat. No. 5,361,404, entitled "Diversity Receiving System", in the name of Paul W. Dent and assigned to the assignee of the present invention, selective diversity is used to select the best combination within a receiving system. However, in the present invention the actual most desirable combination does not matter. It is only the changing of the combination with successive frequency hops in either a random or a known way which enables the channel coding and interleaving to eliminate losses due to fading. Somewhat less complex circuity is required to perform these functions in the present invention than in the selective diversity optimization system of the above-referenced Dent application.

In the embodiment of the present invention which employs multiple receiver antennas it is possible that the signal delay chosen can be on the order of a symbol period. In such case if the demodulator can handle echo signals, then a diversity advantage can be obtained without the need of frequency hopping. While it is difficult to delay one of the antenna signals by as much as a symbol period, this can be accomplished through receiver processing using filters with different group delay characteristics.

It should also be noted that while the above invention is described for radio systems, it also applicable to other wireless communications systems. Thus, as described above, antennas may refer to any device that transfers the signal either from the transmitter to a transmission medium or from the transmission medium to the receiver. Also, while frequency hopping occurs, the multiple access approach within a hop can be FDMA, TDMA, or CDMA.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. A method of enabling frequency hopping between a signal of a first frequency and a signal of a second frequency, which method comprises:

transmitting the signal from a first transmitting antenna;

transmitting the same signal from a second transmitting antenna after delaying the signal by a preselected time period;

processing in a receiver the received signals from the first and second transmitting antennas;

hopping the frequency of transmission from the first frequency to the second frequency; and changing the time period of the delay at baseband as a function of the frequency of the signal to be transmitted.

2. A method of enabling frequency hopping between a signal of a first frequency and a signal of a second frequency within a relatively narrow system bandwidth as set forth in claim 1, wherein:

the signal transmitted is a TDMA signal.

3. A method of enabling frequency hopping between a signal of a first frequency and a signal of a second frequency, as set forth in claim 1 wherein the delay at baseband between the signal transmitted from the first and second transmitting antennas is small relative to a symbol period of the digital communication signal.

4. A system for enabling frequency hopping between a signal of a first frequency and a signal of a second frequency, comprising:

means for transmitting the signal from a first transmitting antenna;

means for transmitting the same signal from a second transmitting antenna after delaying the signal by a preselected time period;

means for processing in a receiver the received signals from the first and second transmitting antennas;

means for hopping the frequency of transmission from the first frequency to the second frequency; and means for changing the time period of the delay at baseband as a function of the frequency of the signal to be transmitted.

5. A system for enabling frequency hopping between a signal of a first frequency and a signal of a second frequency, as set forth in claim 4, wherein:

the signal transmitted is a TDMA signal.

6. A system for enabling frequency hopping between a signal of a first frequency and a signal of a second frequency as set forth in claim 4 wherein the delay at baseband used between the signal transmitted from the different antennas is small relative to a symbol period of the signal.

7. In a slow frequency hopped digital communication system, a transmitter comprising:

means for generating a slow frequency hopped digital communication signal; and means for transmitting said signal on a plurality of different antennas with each signal being transmitted from each antenna separated from the other signals by phase differences that change at baseband as a function of hop frequency.

8. A slow frequency hopped digital communication system as set forth in claim 7 wherein the phase change between the signals to be broadcast from the different antennas is made at baseband and the signal to be broadcast is passed through a plurality of separate transmit chains.

9. A slow frequency hopped digital communication system as set forth in claim 8 wherein said phase delay is introduced into the signal to be transmitted as a phase offset by rotation of the I and/or Q waveforms of the original signal prior to modulation.

10. A slow frequency hopped digital communication system as set forth in claim 7 wherein said phase delay is introduced into the signal to be transmitted by means of a surface acoustic wave (SAW) device.

11. In a slow frequency hopped digital communication system, the method which comprises:

generating a slow frequency hopped digital communication signal; and transmitting said signal on a plurality of different antennas with each signal being transmitted from each antenna separated from the other signals by phase offsets that change at baseband as a function of hop frequency.

12. In a slow frequency hopped digital communication system the method set forth in claim 11 wherein the phase differences used between the signal transmitted from the different antennas are small relatively to a symbol period of the digital communication signal.

13. In a slow frequency hopped digital communication system the method set forth in claim 11 which includes the additional steps of:

making the phase offsets between the signals to be broadcast from the different antennas at baseband; and passing the signal to be broadcast through a plurality of separate transmit chains.

14. In a slow frequency hopped digital communication system the method set forth in claim 13 wherein said phase offsets are introduced into the signal to be transmitted by rotation of the I and/or Q waveforms of the signal prior to modulation.

15. In a slow frequency hopped digital communication system the method set forth in claim 11 wherein said phase offsets are introduced into the signal to be transmitted by means of a surface acoustic wave (SAW) device.

16. A method of enabling frequency hopping between a signal of a first frequency and a signal at baseband of a second frequency, which method comprises:

transmitting the signal from a first transmitting antenna;

transmitting the same signal from a second transmitting antenna after delaying at baseband the signal by a preselected time period, said delay between the signal transmitted from the first and second transmitting antennas being small relative to a symbol period of the signal;

processing in a receiver the received signals from the first and second transmitting antennas; and hopping the frequency of transmission from the first frequency to the second frequency.

17. The method of enabling frequency hopping between a signal of a first frequency and a signal of a second frequency, as set forth in claim 16, wherein:

the signal transmitted is a TDMA signal.

18. The method of enabling frequency hopping between a signal of a first frequency and a signal of a second frequency, as set forth in claim 16 and which also includes the additional step of:

changing the time period of the delay at baseband as a function of the frequency of the signal to be transmitted.

19. A system for enabling frequency hopping between a signal of a first frequency and a signal of a second frequency, comprising:

means for transmitting the signal from a first transmitting antenna;

means for transmitting the same signal from a second transmitting antenna after delaying the signal at baseband by a preselected time period, said delay between the signal transmitted from the first and second transmitting antennas being small relative to a symbol period of the signal;

means for processing in a receiver the received signals from the first and second transmitting antennas; and means for hopping the frequency of transmission from the first frequency to the second frequency.

20. The system for enabling frequency hopping between a signal of a first frequency and a signal of a second frequency, as set forth in claim 19, wherein:

the signal transmitted is a TDMA signal.

21. The system for enabling frequency hopping between a signal of a first frequency and a signal of a second frequency, as set forth in claim 19 and which also includes:

means for changing the time period of the delay at baseband as a function of the frequency of the signal to be transmitted.

* * * * *

UNITED STATES PATENT AND TRADEMARK OFFICE
CERTIFICATE OF CORRECTION

PATENT NO : 6,034,987
DATED : March 7, 2000
INVENTOR(S): Chennakeshu et al.

It is certified that error appears in the above-identified patent and that said Letters Patent are hereby corrected as shown below:

References Cited [56]  Replace
"5,563,610 10/1996 Reudink et al."
With--5,563,610 10/1996 Reudink 342,375--

Attorney, Agent, or Firm  Replace "Jenkens + Gilchrist"
With --Jenkens & Gilchrist, PC--

Column 6, line 34  After "modifier 45"
Insert --(transmit filter 45A)--

Column 9, line 32  Delete "at baseband"

Signed and Sealed this

Seventeenth Day of April, 2001

Attest:

NICHOLAS P. GODICI

Attesting Officer    Acting Director of the United States Patent and Trademark Office